Aug. 23, 1966

H. G. LEE ETAL 3,268,712

ELECTRO-MECHANICAL READOUT DEVICE

Filed Aug. 27, 1963

INVENTORS
HAROLD G. LEE
HOWARD M. ALLEN

BY  BUCKHORN, BLORE,
KLARQUIST & SPARKMAN
ATTORNEYS

Aug. 23, 1966

H. G. LEE ETAL 3,268,712

ELECTRO-MECHANICAL READOUT DEVICE

Filed Aug. 27, 1963

INVENTORS
HAROLD G. LEE
HOWARD M. ALLEN
BY BUCKHORN, BLORE,
KLARQUIST & SPARKMAN
ATTORNEYS

United States Patent Office 3,268,712
Patented August 23, 1966

3,268,712
ELECTRO-MECHANICAL READOUT DEVICE
Harold G. Lee and Howard M. Allen, Portland, Oreg., assignors to Leopold & Stevens Instruments, Inc., Portland, Oreg., a corporation of Oregon
Filed Aug. 27, 1963, Ser. No. 304,780
9 Claims. (Cl. 235—92)

The subject matter of the present invention relates generally to shaft position encoders and in particular to an electro-mechanical readout device for use in such encoders to produce an electrical signal corresponding to the reading of mechanical counter forming part of such shaft position encoder.

The electro-mechanical readout device of the present invention is especially useful when employed in a liquid level encoder with a binary counter which registers the number of revolutions of a shaft connected to a float pulley to indicate the level of the liquid by such counter and readout device, but may be employed with any shaft position encoder. The present electro-mechanical readout device has several advantages over previous readout devices, including the use of a simple latching mechanism to maintain the readout signal corresponding to the previous counter reading until a subsequent counter reading is taken. Thus, the number sensed at the readout position of the counter by the readout device during the preceding interrogation operation is stored mechanically until another counter reading is taken by such readout device during a subsequent interrogation operation. This mechanical storage of the previous counter reading enables rapid reviewing to check the last indicated position of the liquid level before taking a new counter reading and enables the change in liquid level to be rapidly determined merely by subtracting the two readings. Many readings of different variables can be taken simultaneously to correlate the data in a system. Since the interrogation period is less than one second this encoder can be used to "follow" fast changing variables. The memory outputs are connected in parallel making the present encoder compatible with many types and speeds of existing telemetering systems. Another advantage of the readout device of the present invention is its simple, trouble free construction which enables the reading of the mechanical counter to be converted quickly and accurately into an electrical signal of the coded switch states merely by opening and closing a plurality of reed switches by movement of a plurality of permanent magnets in such readout device. The coded pulses of the readout signal may be transmitted to a computer which decodes, records and stores the information contained in such signal and which may also perform other operations in response to the information received from the readout device, such as automatically filling or emptying a fluid container to maintain the liquid level therein within predetermined limits as part of a chemical process. Alternatively, the reed switches in the electro-mechanical readout device may be connected through suitable matrixing circuits to any suitable visual display device. Another advantage of the present readout device is its compact size which is made possible by providing a magnetic shield around the reed switches so that such switches may be positioned closer together without being operated by the wrong permanent magnet.

It is therefore one object of the present invention to provide an improved shaft position encoder.

Another object of the invention is to provide an improved electro-mechanical readout device for the mechanical counter employed in a shaft position encoder so such readout device is of simple and economical construction.

A further object of the present invention is to provide an improved electro-mechanical readout device which produces an electrical readout signal by movement of a plurality of permanent magnets with respect to a plurality of reed switches.

An additional object of the invention is to provide an improved electro-mechanical readout device for a mechanical counter, which senses the reading of such counter and produces an electrical signal corresponding to such reading during an interrogation operation, and which mechanically stores the counter reading so obtained until a subsequent counter interrogation is performed.

Still another object of the invention is to provide an improved electro-mechanical readout device in which magnetic shields are employed to isolate reed switches in such readout device to enable reliable operation of such switches and to reduce the size of the readout device.

Other objects and advantages of the present invention will be apparent from the following detailed description of a preferred embodiment thereof, of which:

Figure 1:
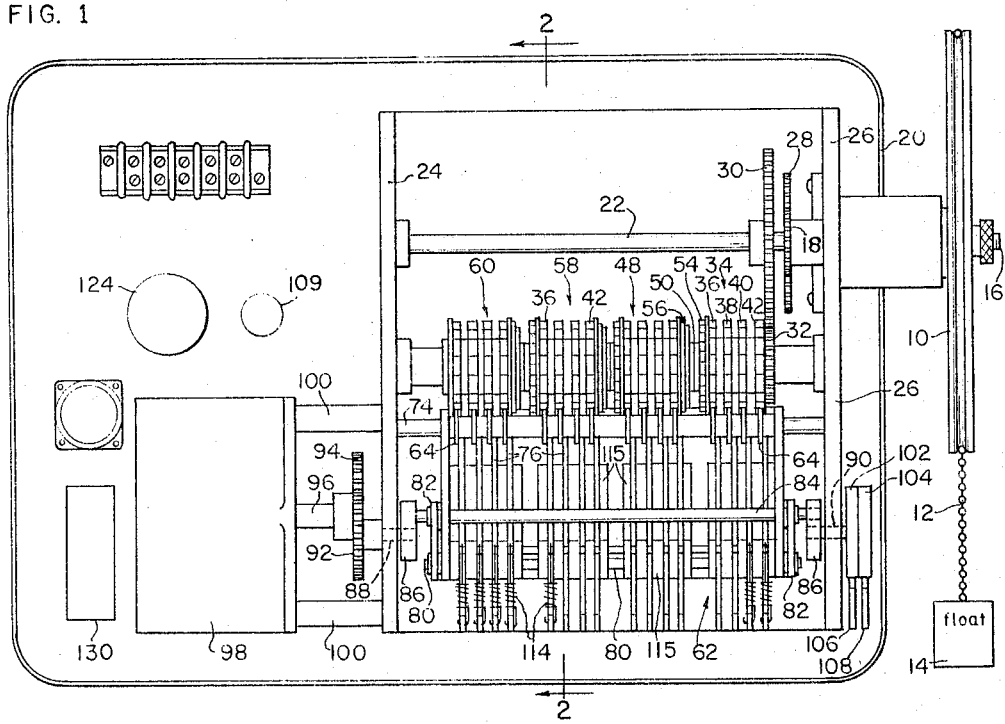
FIG. 1 is a plan view of the preferred embodiment of the shaft position encoder of the present invention with a portion of the cover removed for clarity.
Figure 2:
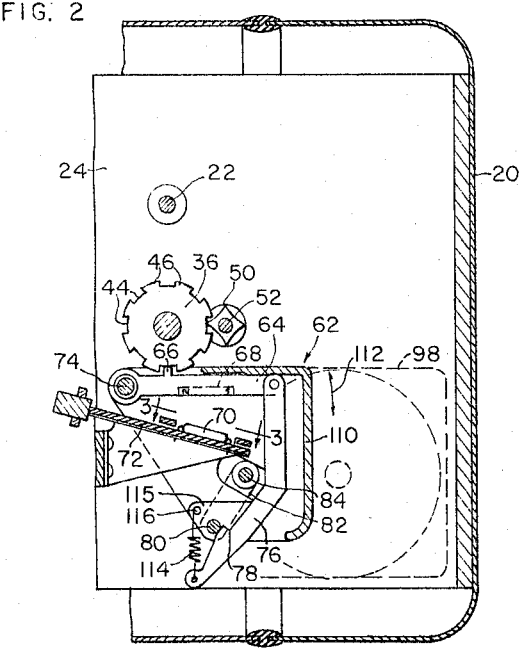
FIG. 2 is a vertical section view taken along the line 2—2 of FIG. 1.

As shown in FIGS. 1 and 2 the shaft position encoder of the present invention may include a float pulley 10 which is rotated by a chain 12 which engages an annular groove in the periphery of such pulley and has one end attached to a float 14 and its other end attached to a suitable weight (not shown). The float 14 moves with the liquid level to be recorded and causes a chain 12 to rotate the float pulley accordingly. The float pulley is attached to a pulley shaft 16 at one end thereof, while a gear 28 is attached to the other end of such pulley shaft extending through the side of a dust proof casing 20. A second shaft 22 is rotatably mounted between a pair of support plates 24 and 26, and a small gear 18 is secured to the second shaft in engagement with the gear 28 on the pulley shaft so that such second shaft is rotated by movement of such pulley shaft. A large gear 30 is also attached to the shaft 22 so that it engages a drive gear 32 secured to the shaft of a first counter stage 34 of a four stage mechanical counter.

The first counter stage 34 may include four spaced encoding discs 36, 38, 40 and 42 which are secured to the shaft of such counter stage for rotation with the drive gear 32 and against relative rotation between discs. The encoding discs are each provided with a plurality of notches 44 and projections 46 which may be arranged in a binary code so that the notches represent a "0" and the projections a "1" in such code, or vice versa. The first counter stage 34 may be connected to a second counter stage 48 by a transfer gear 50 of the Geneva type mounted on an idler shaft 52 between such counter stages as shown in FIG. 2. The teeth of such transfer gear engage the teeth of an output gear 54 of the Geneva type secured to the shaft of the first counter stage and also engage the teeth of an input gear 56 of the Geneva type secured to the shaft of second counter stage 48. The ratio of teeth of such gears may be set so that ten rotations of the shaft of the first counter stage are required for a single rotation of the shaft of the second counter stage. In a similar manner, the second counter stage is geared to a third counter stage 58 which in turn is geared to a fourth counter stage 60 each of which have four encoding discs 36, 38, 40 and 42.

From the above, it can be seen that the rotation of the float pulley 10 by movement of float 14 in accordance with the water level causes rotation of the encoding discs of the counter stages 34, 48, 58 and 60 in accordance with the water level causes rotation of the encoding discs of the counter stages 34, 48, 58 and 60 in accordance with the distance of travel of such float. The notches 44 and the projections 46 on the encoding discs of each counter stage can be arranged in the proper manner to provide a decimal binary code by providing 8 equally spaced projections on disc 36, 4 projections on disc 38, 2 projections on disc 40, and 1 projection on disc 42. Thus, the first counter stage 34 may indicate fluid level changes of .01 inch, while the second counter stage 48 indicates changes of 0.1 inch and the third and fourth counter stages 58 and 60 record changes of 1.0 and 10.0 inches respectively.

An electro-mechanical readout device 62 is provided within the casing 20 of the shaft position encoder to obtain an electrical signal corresponding to a reading of the counter stages. The readout device 62 includes a plurality of interrogation fingers 64 each in the form of a flat metal member which is provided with a sensing element 66 extending laterally therefrom for engagement with either a notch 44 or a projection 46 on one of the encoding discs of the counter stages at the readout position of such counter stages. A permanent magnet 68 is secured to each of the interrogation fingers 64 positioned directly above one of a plurality of reed switches 70 mounted on the upper side of a printed circuit board 72. Each of the interrogation fingers 64 is pivotally mounted at one end thereof on a fixed shaft 74 which secured between the support plates 24 and 26. The other end of each of the interrogation fingers is pivotally attached to a latching arm 76 which is provided with a latch projection 78 adjacent the other end of such latching arm for engagement with a latching rod 80. The latching rod 80 is connected by a pair of links 82 to a clearing rod 84, as shown in FIG. 1, at the opposite ends of such rods. The clearing rod 84 is connected by a pair of crank members 86 to shafts 88 and 90 at the opposite ends of such clearing rod extending through support plates 24 and 26, respectively.

The shaft 88 in FIG. 1 at the left end of the clearing rod is attached to a gear 92 which engages a gear 94 mounted on the drive shaft 96 of an electrical motor 98. The motor 98 is secured to the support plate 24 by bolts (not shown) extending through spacer sleeves 100. When the electric motor 98 is energized, it causes rotation of the clearing rod 84 by crank member 86 around the shaft 88 to actuate the readout device 62 in a manner hereafter described. The shaft 90 at the right end of such clearing rod is attached to a pair of cams 102 and 104 which operate the cam follower switch contacts of a motor maintain switch 106 and a computer lockout switch 108, respectively. When the encoder is called upon to interrogate, motor relay 109 is energized thus enabling the motor circuit. This relay is "locked in" through one side of the motor maintain switch 106. Near completion of one revolution of shaft 90, cam 102 momentarily actuates switch 106, releasing relay 109 but maintaining the motor connected to a source of electrical power for the remainder of the revolution of shaft 90. At this time cam 102 transfers such switch back to the relay operate position and disconnects the motor. This rotates the clearing rod 84 one revolution and causes the readout device 62 to perform an interrogation operation. A suitable indexing mechanism (not shown) such as that described in my copending United States patent application, Serial No. 241,422, entitled Magnetic Data Recorder, filed November 30, 1962, may be connected to the shaft of the first counter stage 34 to prevent movement of the encoding discs of all stages when a counter reading is being taken by the readout device 62 and to insure that the encoding discs are held in their number positions at this time so that it is not possible to make an ambiguous counter reading of the discs between number positions.

The latching rod 80 is connected to a cradle 110 for all of the interrogation fingers which is pivotally mounted on the fixed shaft 74 so that rotation of the clearing rod 84 pivots the cradle 110 about such fixed shaft by means of the connecting links 82 in the direction of arrows 112, as shown in FIG. 2. Each of the latching arms 76 are resiliently connected to the cradle 110 by a coil spring 114 which extends over a pin 116 projecting from a partition 115 in such cradle. Thus, upward movement of the cradle 110 due to rotation of the clearing rod 84 also causes upward movement of the latching arm 76 and interrogation finger 64. The interrogation finger 64 pivots about the shaft 74 until the sensing element 66 on such finger engages the surface of one of the encoding discs either in a notch 44 or on a projection 46 of such one encoding disc. When the sensing element 66 engages a notch in the encoding disc, as shown in FIG. 2, the interrogation finger 64 remains in engagement with the underside of the cradle 110 to position the magnet 68 a greater distance from the reed switch 70 than it would be if such sensing element had engaged a projection on such encoding disc. This difference in spacing of the interrogation finger from the cradle controls whether the latching rod 80 engages the latch projection 78 on the latching arm 76 which determines whether or not the contacts of the reed switch 70 are closed by the magnet 68 during a subsequent downward movement of the cradle 110 to the rest positions shown in FIGS. 5A and 6A.

Figure 3:
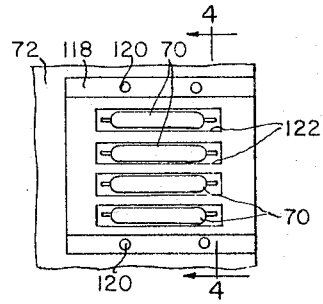
FIG. 3 is a view taken along the line 3—3 of FIG. 2 showing one group of reed switches and the magnetic shield associated therewith which are employed in the readout device of the present invention.
Figure 4:
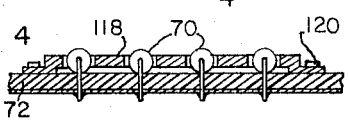
FIG. 4 is a vertical section view taken along the line 4—4 of FIG. 3.

As shown in FIGS. 3 and 4, a magnetic shield member 118 made of a sheet of soft iron or other magnetic material may be mounted on the printed circuit board 72 by two pairs of rivets 120 extending through holes in such shield member and circuit board in order to isolate each of the four reed switches 70 associated with the encoding discs of each of the counter stages. These shield members magnetically shield the reed switches from the permanent magnets 68 on adjacent interrogation fingers 64 and direct the magnetic flux in a path so that only the contacts of the single switch positioned directly below the magnet associated therewith are operated by such magnet. Thus, each of the shield members 118 may be provided with four rectangular apertures 122 therein of a size slightly greater than the reed switches 70 contained therein. It should be noted that the magnetic shield has a flange around the outer edge thereof to space the central portion of such shield away from the circuit board 72 for better shielding of the contacts of such switches. In a preferred embodiment of the invention the reed switches are ⅛ inch in diameter and are mounted so that their lead wires extend through holes in the printed circuit board, which are spaced apart by one-quarter inch and are separated by a lateral element of the magnetic shield which is .04 inch wide and .02 inch thick. An alternative type of shield would be a plurality of spaced rods of soft iron positioned between the reed switches in place of the lateral extending elements of the integral shield member 118. The magnetic shielding allows the reed switches 70 to be placed closer together and enables the readout device 62 to be more compact than if such a shield were not employed.

Figure 5A:
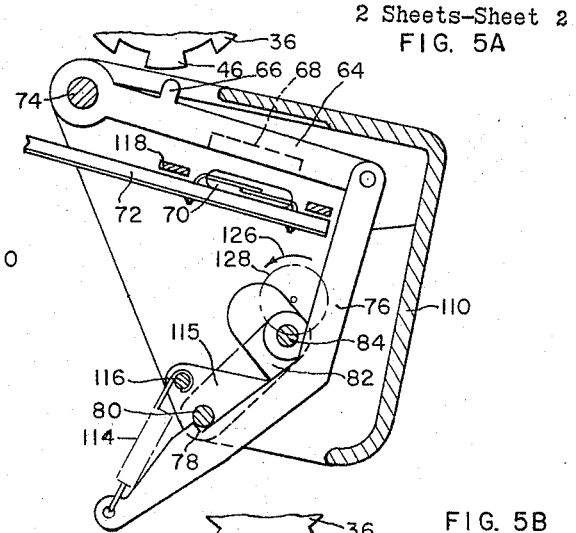
FIGS. 5A, 5B and 5C show different steps in one operation of the readout device of the present invention.
Figure 5B:
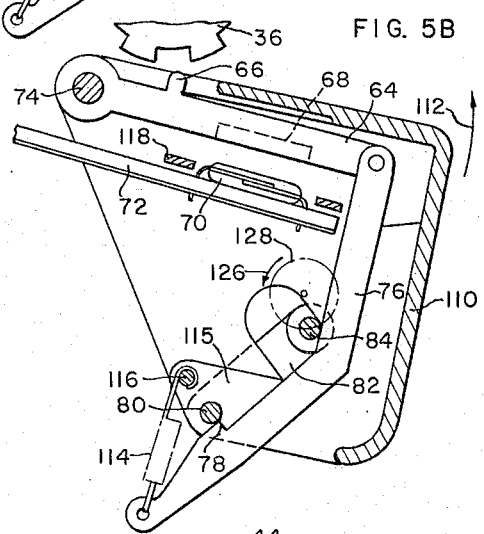

The operation of the readout device 62 of the present invention is best understood with regard to FIGS. 5A to 5C and FIGS. 6A to 6C, which disclose two different cycles of operation in which a reading is taken with a notch and then a projection of an encoding disc 36 in the readout position of the counter. As shown in FIG. 5A, the interrogation finger 64 is positioned at rest in the down or latched position spaced from the cradle 110 starting one cycle of operation, due to the fact that the sensing element 66 has engaged a projection 46 on the encoding disc during the previous interrogation operation. In this latched position the latching arm 76 is secured to the latching rod 80 by projection 78 and the permanent magnet 68 is closely spaced to the reed switch 70 so that the contacts of such switch are closed. During interrogation the clearing rod 84 is caused to rotate in the counterclockwise direction of arrow 126 along the path of dotted line 128, as shown in FIG. 5A. As a result the clearing rod 84 moves into engagement with the latching arm 76, moving such latching arm to the right until the projection 78 disengages from the latching rod 80. This enables the interrogation finger 64 to be moved upward into engagement with the lower surface of the cradle 110 by the spring 114, as shown in FIG. 5B, and also causes counterclockwise rotation of the cradle in the direction of arrow 112. Continued counterclockwise rotation of the clearing rod 84 along path 128 by the interrogation motor causes the interrogation finger and the cradle to move upward into the readout position shown in FIG. 5C. Since the encoding disc 36 has moved to a new reading, the sensing element of the interrogation finger now engages a notch 44 rather than a projection on the encoding disc. The interrogation finger remains in contact with the cradle 110 and the latching arm 76 remains in an unlatched position during the downward movement of the cradle caused by continued counterclockwise rotation of the clearing rod 84 from the position of FIG. 5C to the at rest position of FIG. 6A. In the at rest position of FIG. 6A, the permanent magnet 68 is spaced a great enough distance away from the reed switch 70 so that the contacts of such switch remain open. Thus, the two at rest positions of the interrogating finger shown at FIG. 5A and FIG. 6A correspond to the closed and open positions, respectively, of the reed switch which produce the two different binary signals transmitted from the readout device.

Figure 6A:
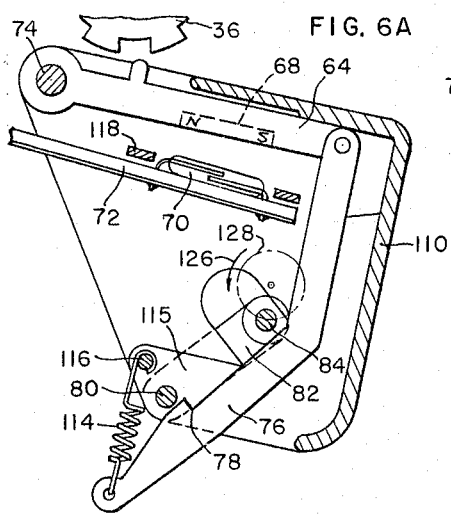
FIGS. 6A, 6B and 6C show different steps in another operation of the readout device of the present invention.
Figure 6B:
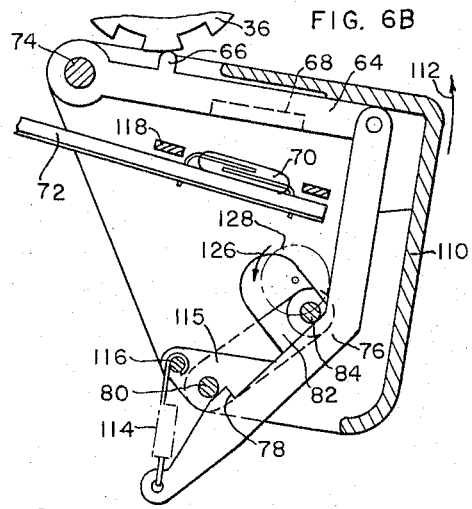
Figure 6C:
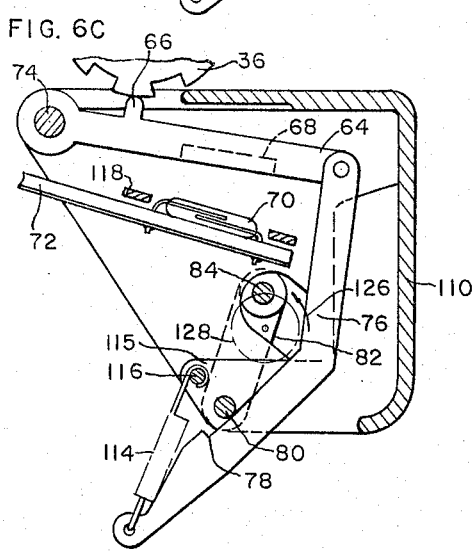
Figure 5C:
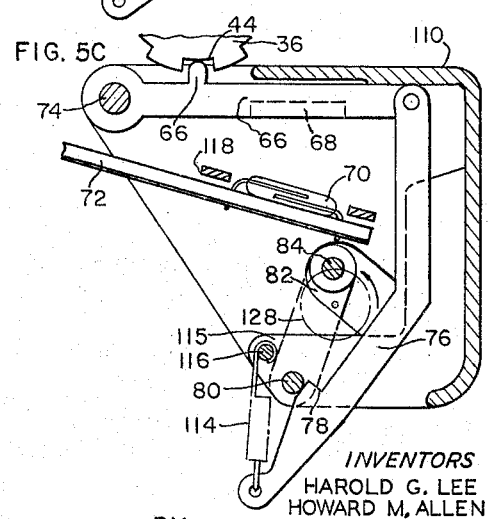

Another interrogation operation of the readout device is shown in FIGS. 6A to 6C, with the interrogation finger 64 starting in the unlatched at rest position in engagement with the cradle 110 as shown in FIG. 6A, due to the fact that its sensing element engaged a notch 44 in the encoding disc during the previous interrogation operation. Rotation of the clearing rod 84 in the counterclockwise direction 126 into engagement with the latching arm does not cause unlatching because such latching arm is already unlatched from the rod 80. However, the cradle 110 and interrogation finger 64 are moved upward by the rotation of the clearing rod, in the direction of arrow 112 to the readout position shown in FIG. 6B, where the sensing element of such interrogation finger engages a projection on the encoding disc 36. Further counterclockwise rotation of the clearing rod causes the cradle 110 to continue to rise until it is the readout position shown in FIG. 6C, but the interrogation finger is prevented from further upward movement and is separated from contact with the cradle. During this continued counterclockwise rotation of the cradle the latching rod 80 continues to move with such cradle over the latch projection 78 on the latching arm 76 until it is in the position shown in FIG. 6C. Thus, further counterclockwise rotation of the clearing rod 84 by the interrogation motor causes the cradle 110 to pivot back downward to the at rest position shown in FIG. 5A, and causes the latching rod 80 to slide down the latching arm 76 until the latching rod engages the latch projection 78 on the latching arm and holds such latching arm in the down or latched position shown in FIG. 5A. As stated previously, the permanent magnet 68 is now again more closely spaced with respect to the reed switch 70, so that the movable contacts of such switch are closed to produce an electrical readout signal corresponding to the presence of a projection 46 in the readout position of the encoding disc. This completes another cycle of operation of the readout device.

It should be noted that each of the encoding discs of the four counter stages has an interrogation finger 64, a permanent magnet 68 and a reed switch 70 associated therewith, so that a different electrical signal is transmitted to the output terminal plug 130 of the shaft position encoder apparatus for each encoding disc. Also, the spring 114 functions to hold the latching arm 76 in both the latched position of FIG. 5A and the unlatched position of FIG. 6A, in order to mechanically store the number of the last counter reading taken during the previous interrogation operation. This mechanical storage continues for an indefinite period of time until a subsequent interrogation operation is performed causing the latching arms of the readout device to move to a different position.

It will be obvious to those having ordinary skill in the art that various changes may be made in the details of the above described preferred embodiment of the present invention without departing from the spirit of the invention. For example, the shaft position encoder is not limited to liquid level recorders but may be used to determine the number of rotations of any shaft, by coupling shaft 22 thereto. In this regard, the float pulley 10 may be replaced by a self synchronous receiver motor which is electrically connected to a remotely positioned self synchronous transmitter motor connected to the shaft of a remotely positioned float pulley. Therefore, the scope of the invention should only be determined by the following claims.

We claim:
1. A readout device for a mechanical counter, comprising:
   interrogation means for sensing the reading of the counter by moving into engagement with at least one encoding element of said counter;
   magnetic switch actuating means associated with said interrogation means, at least a portion of which moves with said interrogation means to at least two different readout positions corresponding to different counter readings; and
   switch means operated by said actuating means, for transmitting an electrical signal from said readout device when said actuating means is moved to said readout positions to change the connection of the contacts of said switch means.

2. A readout device for a mechanical counter, comprising:
   interrogation means for sensing the reading of the counter by moving into engagement with at least one encoding element of said counter;
   switch actuating means associated with said interrogation means, for movement with said interrogation means to at least two different readout positions corresponding to different counter readings;
   switch means operated by said actuating means, for transmitting an electrical signal from said readout device when said actuating means is moved to said readout positions to change the connection of the contacts of said switch means; and
   latching means for holding said actuating means in previous readout position to which said actuating means is moved by said interrogation means and for releasing said actuating means when said interrogation means is moved to take another counter reading, in order to mechanically store the previous counter reading until a subsequent counter reading is taken.

3. A readout device for a mechanical counter, comprising:
   interrogation means for sensing the reading of the counter by moving into engagement with notches and projections on rotatable encoding discs in said counter;

magnet means including a plurality of permanent magnets associated with said encoding discs, for movement with said interrogation means to locate said magnets in at least two different readout positions corresponding to a notch and a projection on said encoding discs;

switch means including a plurality of switches having magnetic contacts, for transmitting an electrical signal from said readout device when said magnets are moved to said readout positions to change said contacts between open and closed switch positions;

latching means for holding said magnets in the readout position to which said magnets are moved by said interrogation means and for releasing said magnets when said interrogation means takes another counter reading, in order to mechanically store the previous counter reading until a subsequent counter reading is taken.

4. A readout device for a mechanical counter, comprising:

interrogation means for sensing the reading of the counter by moving into engagement with notches and projections on encoding discs in said counter;

magnet means including a plurality of magnets associated with said encoding discs, for movement with said interrogation means to locate said magnets at leas two different readout positions corresponding to a notch and a projection on said discs;

switch means including a plurality of switches having magnetic contacts, each of said switches being associated with a different one of said magnets for transmitting an electrical signal from said readout device when said magnets are moved to said readout positions to change said contacts between open and closed switch positions;

magnetic shield means for isolating the contacts of each of said switches from the fields of said magnets except for the one magnet associated with each switch; and latching means for holding said magnets in the readout position to which said magnets are moved by said interrogation means and for releasing said magnets when said interrogation means takes another counter reading, in order to mechanically store the previous counter reading until a subsequent counter reading is taken.

5. A shaft position encoder apparatus, comprising:
an encoder shaft;
a mechanical counter including a plurality of spaced encoding discs having spaced notches and projections arranged in a numerical code about the periphery of said discs;
coupling means for connecting said encoder shaft to said counter to rotate said discs so that the counter reading indicated by the notches and projections of said discs at the readout position of said counter corresponds to the number of revolutions of said encoder shaft;
a plurality of interrogation finger members pivotally mounted at one end thereof, each of said finger members having a sensing element projecting from the side thereof at a position to engage a notch or a projection of one of said discs at said readout position;
a plurality of switch actuating means provided on each of said finger members;
a plurality of switches mounted adjacent said finger member so that the contacts of one of said switches are operated by one of said actuating means in response to movement of one of said finger members toward said one switch;
a cradle pivotally mounted adjacent said one end of said finger members and having stop surfaces for engagement with said finger members;
a plurality of springs connected between said cradle and said finger members to resiliently urge said finger members toward said stop surfaces; and
means for pivoting said cradle member to move said finger members toward and away from said encoding discs.

6. A shaft position encoder apparatus, comprising:
an encoder shaft;
a mechanical counter including an encoding disc having spaced notches and projections arranged in a numerical code about the periphery of said disc;
coupling means for connecting said encoder shaft to said counter to rotate said disc so that the counter reading indicated by the notches and projections of said disc at the readout position of said counter corresponds to the rotational position of said encoder shaft;
a support shaft;
an interrogation finger member pivotally mounted at one end thereof on said support shaft, said finger member having a sensing element projecting from one side thereof at a position to engage a notch or a projection of said disc at said readout position;
a latching arm pivotally connected at one end to the other end of said finger member, said arm having a latch portion projecting from the side thereof;
a permanent magnet mounted on the other side of said finger member;
a switch mounted adjacent said magnet to be operated by movement of said magnet;
a cradle pivotally mounted on said support shaft and having a stop surface for engagement with said finger member;
a spring connected between said cradle and the other end of said latching arm to resiliently urge said finger member toward said stop surface;
a latching rod secured to said cradle for engagement with the latch portion of said latching arm to hold the interrogation finger spaced from said stop surface when the sensing elements on said finger engage projections on said disc;
a clearing rod mounted adjacent said latching arm to remove the latch portion thereof from engagement with said latching rod by rotation of said clearing rod about an external axis; and
link means for connecting said latching rod to said clearing rod so that rotation of said clearing rod causes said cradle and said finger member to pivot about said support shaft.

7. A shaft position encoder apparatus, comprising:
an encoder shaft;
a mechanical counter including a plurality of spaced encoding discs having spaced notches and projections arranged in a numerical code about the periphery of said discs;
coupling means for connecting said encoder shaft to said counter to rotate said discs so that the counter reading indicated by the notches and projections of said discs at the readout position of said counter corresponds to the number of revolutions of said encoder shaft;
a support shaft;
a plurality of interrogation finger members pivotally mounted at one end thereof on said support shaft, each of said finger members having a sensing element projecting from the side thereof at a position to engage a notch or a projection of one of said discs at said readout position;
a plurality of latching arms pivotally connected at one end to the other end of said finger members, each of said arms having a latch portion projection from the side thereof;
a plurality of permanent magnets mounted with one of said magnets on each of said finger members;

a plurality of reed switches mounted adjacent said magnets so that one of said switches can be operated by one of said magnets;
a cradle pivotally mounted on said support shaft and having stop surfaces for engagement with said finger members;
a plurality of springs connected between said cradle and the other end of said latching arms to resiliently urge said finger members toward said stop surfaces;
a latching rod secured to said cradle for engagement with the latch portion of said latching arm to hold the interrogation fingers spaced from said stop surfaces when the sensing elements on said fingers engage projections on said discs;
a clearing rod mounted adjacent said latching arm in position to unlatch the latch portion thereof from said latching rod by rotation of said clearing rod about an external axis;
link means for connecting said latching rod to said clearing rod so that rotation of said clearing rod causes said cradle and said interrogation finger member to pivot about said support shaft; and
motor means for rotating said clearing rod about said external axis one complete revolution for each counter reading taken.

8. A shaft position encoder apparatus, comprising:
an encoder shaft;
a mechanical counter including a plurality of spaced encoding discs having spaced notches and projections arranged in a numerical code about the periphery of said discs;
coupling means for connecting said encoder shaft to said counter to rotate said discs so that the counter reading indicated by the notches and projections of said discs at the readout poistion of said counter corresponds to the number of revolutions of said encoder shaft;
a support shaft;
a plurality of interrogation finger members pivotally mounted at one end thereof on said support shaft, each of said finger members having a sensing element projecting from the side thereof at a position to engage a notch or a projection of one of said discs at said readout position;
a plurality of latching arms pivotally connected at one end to the other end of said finger members, each of said arms having a latch portion projection from the side thereof;
a plurality of permanent magnets mounted with one of said magnets on each of said finger members;
a plurality of reed switches mounted adjacent said magnets so that one of said switches can be operated by movement of one of said magnets;
a cradle pivotally mounted on said support shaft and having stop surfaces for engagement with said finger members;
a magnetic shield plate having a plurality of apertures therein supported with one of said switches positioned in each of said apertures;
a plurality of springs connected between said cradle and the other end of said latching arms to resiliently urge said finger members toward said stop surfaces;
a latching rod secured to said cradle for engagement with the latch portion of said latching arm to hold the interrogation fingers spaced from said stop surfaces when the sensing elements on said fingers engage projections on said discs;
a clearing rod mounted adjacent said latching arm to unlatch the latch portion thereof from said latching rod by rotation of said clearing rod about an external axis;
link means for connecting said latching rod to said clearing rod so that rotation of said clearing rod causes said cradle and said interrogation finger member to pivot about said support shaft; and
motor means for rotating said clearing rod about said external axis one complete revolution for each counter reading.

9. A shaft position encoder apparatus, comprising:
an encoder shaft;
a mechanical counter including an encoding disc having spaced notches and projections arranged in a numerical code about the periphery of said disc;
coupling means for connecting said encoder shaft to said counter to rotate said disc so that the counter reading indicated by the notches and projections of said disc at the readout position of said counter corresponds to the rotational position of said encoder shaft;
a support shaft;
an interrogation finger member pivotally mounted at one end thereof on said support shaft, said finger member having a sensing element projecting from the side thereof at a position to engage a notch or a projection of said disc at said readout position;
a latching arm pivotally connected at one end to the other end of said finger member, said arm having a latch portion projecting from the side thereof;
switch means for changing the connection of an electrical circuit in response to movement of said finger member to produce different output signals depending upon whether said sensing element engages a notch or a projection on said disc;
a cradle pivotally mounted on said support shaft and having a stop surface for engagement with said finger member;
a spring connected between said cradle and the other end of said latching arm to resiliently urge said finger member toward said stop surface;
a latching rod secured to said cradle for engagement with the latch portion of said latching arm to hold the interrogation finger spaced from said stop surface when the sensing elements on said finger engage projections on said disc;
a clearing rod mounted adjacent said latching arm to unlatch the latch portion thereof from said latching rod by rotation of said clearing rod about an external axis; and
link means for connecting said latching rod to said clearing rod so that rotation of said clearing rod causes said cradle and said finger member to pivot about said support shaft.

No references cited.

DARYL W. COOK, *Acting Primary Examiner.*

J. F. MILLER, *Assistant Examiner.*